US006781947B2

United States Patent
Motegi et al.

(10) Patent No.: US 6,781,947 B2
(45) Date of Patent: Aug. 24, 2004

(54) OPTICAL PICKUP APPARATUS

(75) Inventors: Takehiro Motegi, Saitama (JP);
Shinichi Takahashi, Saitama (JP);
Mitsutoshi Sugano, Saitama (JP); Ko Ishii, Saitama (JP); Yoshihiro Seita, Saitama (JP); Makoto Kawamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 299 days.

(21) Appl. No.: 09/955,977

(22) Filed: Sep. 20, 2001

(65) Prior Publication Data

US 2002/0036971 A1 Mar. 28, 2002

(30) Foreign Application Priority Data

Sep. 22, 2000 (JP) ..................................... P.2000-288439

(51) Int. Cl.[7] ................................................. G11B 7/00
(52) U.S. Cl. ................................ 369/112.28; 369/116
(58) Field of Search ........................... 369/44.31, 44.37, 369/44.38, 116, 112.28, 112.29, 53.26, 53.27, 44.23

(56) References Cited

U.S. PATENT DOCUMENTS

| | | | | |
|---|---|---|---|---|
| 5,247,167 A | | 9/1993 | Bargerhuff et al. ...... 250/208.1 |
| 5,995,476 A | | 11/1999 | Kim ............................. 369/112 |
| 6,041,027 A | * | 3/2000 | Kim et al. ................ 369/44.27 |
| 6,147,947 A | | 11/2000 | Sofue ........................... 369/58 |
| 6,552,974 B1 | * | 4/2003 | Kim ........................ 369/44.37 |

FOREIGN PATENT DOCUMENTS

| | | |
|---|---|---|
| EP | 0 786 836 A2 | 7/1997 |
| EP | 0 886 263 A2 | 12/1998 |
| EP | 1 047 051 A2 | 10/2000 |
| JP | 10-312574 | 11/1998 |

OTHER PUBLICATIONS

M. Shozakai et al., "A Non–Iterative Model–Adaptive E–CMN/PMC Approach for Speech Recognition in Car Environments," 5th European Conference on Speech Communication and Technology, *Eurospeech 97*, vol. 1, Sep. 22–25, 1997, pp. 287–290.

* cited by examiner

*Primary Examiner*—Thang V. Tran
(74) *Attorney, Agent, or Firm*—Morgan, Lewis & Bockius LLP

(57) ABSTRACT

Laser beams $h_1$, $h_2$ with different wavelengths emitted from semiconductor lasers $2a$, 3 are incident to an optical path joint prism 13 and each of optical intensities of the laser beams $h_1$, $h_2$ is detected by a photoelectric conversion element 15 provided in an optical path integrated by the optical path joint prism 13 on which a semi-transmission film HM is provided and APC control of each of light emission intensities of the semiconductor lasers $2a$, 3 is performed on a basis of each of detection results. As a result of this, the beam intensity of the laser beam $h_1$ passing through the optical path joint prism 13 to be applied to an information recording medium and the laser beam $h_2$ reflecting the optical path joint prism 13 to be applied to the information recording medium are controlled properly.

6 Claims, 8 Drawing Sheets

OPTICAL PICKUP APPARATUS

BACKGROUND OF THE INVENTION

1. Filed of the Invention

The present invention relates to an optical pickup apparatus for performing information recording or information reproduction to/from an optical type information recording medium with a plurality of light beams, and particularly to an optical pickup apparatus having a monitor mechanism for controlling each of the light beams to proper beam intensity.

2. Description of the Related Art

As an optical type information recording medium, for example, a CD (Compact Disk) and a DVD (Digital Video Disk or Digital Versatile Disk) have been known. Also, with respect to each of these CD and DVD, a write once optical disk capable of recording information once and a rewritable optical disk capable of erasing and rerecording information have been known.

As such various information recording media have been developed, the need for an optical pickup apparatus having compatibility capable of performing information recording or information reproduction without distinguishing these information recording media has been increasing in an information recordinging and reproducing apparatus.

By the way, in order to realize the optical pickup apparatus having compatibility, a plurality of light beams adapted for each of optical properties of the information recording media are required and further, it is necessary to control each of light beams so as to become proper beam intensity and apply the light beams to each of information recording mediua.

However, when an optical system comprises an inherent monitor mechanism for each of the plurality of light beams is constructed to achieve such problems, there are problems that scale or weight of the optical pickup apparatus becomes large.

SUMMARY OF THE INVENTION

The invention is implemented in view of such problems, and an object of the invention is to provide an optical pickup apparatus of which structure has the compatibility and can achieve, for example, miniaturization and weight reduction.

In order to achieve the object, an optical pickup apparatus according to the invention comprises: a plurality of light emission sources adapted to emit light beams having different wavelengths, respectively; an optical path joint unit adapted to join optical paths of the light beams to form common optical path; and a photodetection unit provided in the common optical path and adapted to detect the light beams, wherein each of light emission intensities of the light emission sources is controlled on a basis of a detection result detected by the photodetection unit.

According to the optical pickup apparatus with such a configuration of the invention, the optical path joint unit guides the light beams with the different wavelengths emitted from the light emission sources to the common optical path. Then, the light beams are detected by the photodetection unit provided in the common optical path and the light emission intensities of the light emission sources are controlled on the basis of the detection results. Therefore, the plurality of light beams can be detected by one photodetection unit and an optical pickup apparatus having compatibility capable of, for example, miniaturization and weight reduction is implemented.

Also, in order to achieve the object, there is provided the optical pickup apparatus according to the above described, wherein the number of the plurality of the light emission sources is two; the optical path joint unit comprises: a transparent medium having an first surface and a second surface, which are opposed to each other; and a semi-transmission film provided on the second surface; one of the light beams is incident on the first surface; and the other of the light beams is incident on the second surface.

According to the above described optical pickup apparatus with such a configuration of the invention, when one of the light beams is incident from a side of the first surface to the transparent medium, the one of the light beams is split into a first transmitted beam and a first reflected beam by the semi-transmission film and the first transmitted beam is emitted to an information recording medium and the first reflected beam is emitted to the photodetection unit through the transparent medium. Also, when the other of the light beams is incident from a side of the second surface, the other of light beams is split into a second reflected beam and a second transmitted beam by the semi-transmission film and the second reflected beam is emitted to the information recording medium and also the second transmitted beam is emitted to the photodetection unit through the transparent medium. That is, a part of the one of light beams is formed into the first reflected beam and a part of the other of light beams is formed into the second transmitted beam to be guided to the side of the common optical path and then the light beams (first reflected beam and the second reflected beam) are detected by the photodetection unit provided in the common optical path. Then, the light emission intensities of the light emission sources are controlled on a basis of the detection results, respectively. Therefore, each of the light beams can be detected by one photodetection unit to control each of light emission intensities of the light emission sources on a basis of each the detection result, and an optical pickup apparatus having compatibility capable of, for example, miniaturization and weight reduction is implemented.

Also, in order to achieve the object, an optical pickup apparatus of the invention is characterized in that the first surface and the second surface of the transparent medium are not parallel.

According to the above described optical pickup apparatus with such a configuration of the invention, the first surface and the second surface are set at angles in relation to the laser beams, respectively, so that multiple reflected light beam, which is a light beam reflected between the first and second surfaces repeatedly, does not reach the photodetection unit, that is, the multiple reflected light beam is emitted to a direction deviating from the common optical path. As a result of that, an influence of the multiple reflected light beam can be reduced to perform photodetection necessary to control the light emission intensities of the light emission sources, and the light emission intensities of the light emission sources are controlled with high accuracy.

DETAILED DESCRIPTION OF THE PREFERRED EMBODIMENTS

Embodiments of an optical pickup apparatus according to the invention will be described below with reference to the drawings. Incidentally, an optical pickup apparatus provided in an information recordinging and reproducing apparatus capable of information recording and information reproduction with respect to a write once DVD and a rewritable DVD, a write once CD and a rewritable CD will be described as one embodiment.

Figure 1:
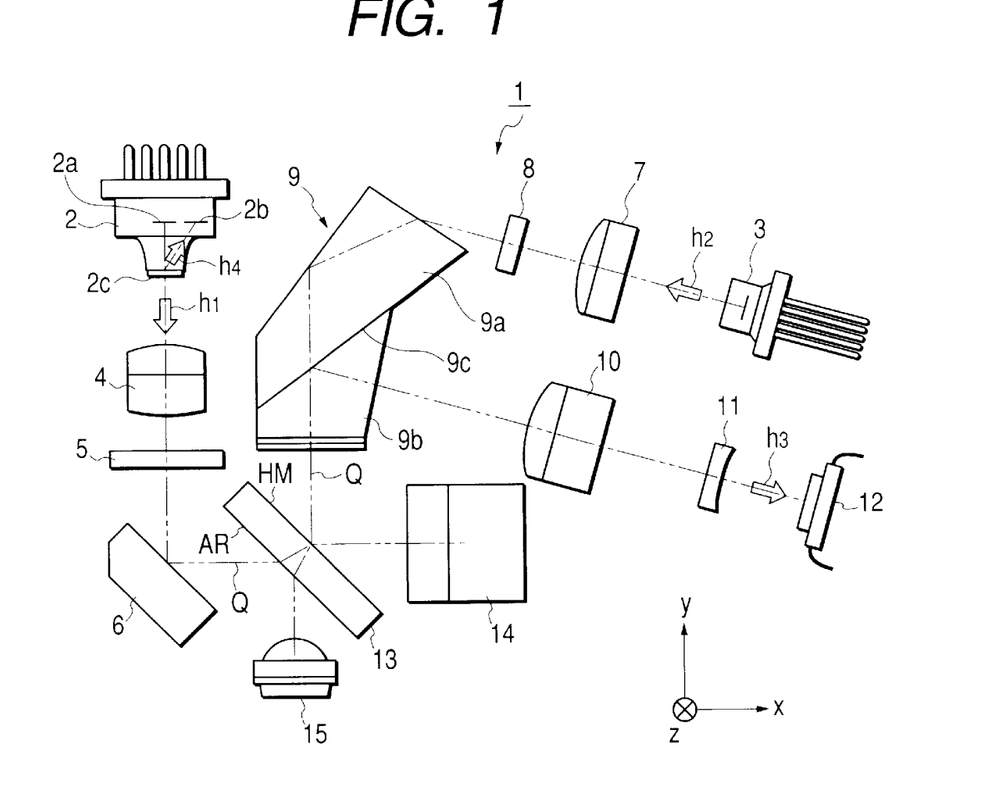
FIG. 1 is a plan view showing a configuration of an optical pickup apparatus of an embodiment.
Figure 2:
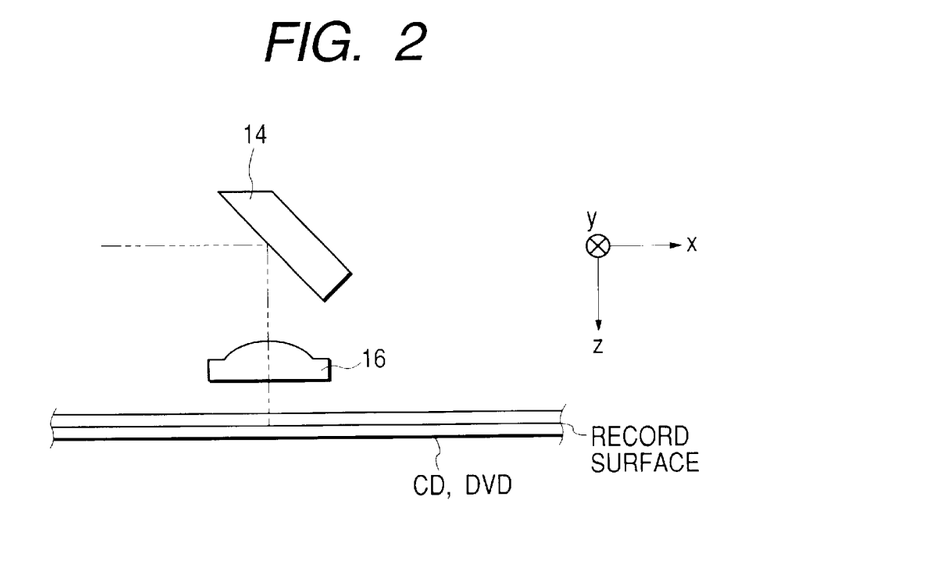
FIG. 2 is a side view showing a part of the configuration of the optical pickup apparatus of the embodiment.

FIGS. 1 and 2 show a configuration of an optical pickup apparatus of the present embodiment. FIG. 1 is a plan view of a case of viewing the optical pickup apparatus from a z-axis direction of three-dimensional orthogonal coordinates xyz. FIG. 2 is a side view of a case of viewing a part of the optical pickup apparatus from a y-axis direction.

In FIG. 1, the present optical pickup apparatus 1 comprises a hologram unit 2, a first semiconductor laser 2a for emitting a laser beam $h_1$ with a predetermined wavelength $\lambda_1$ (780 nm) in the case of making information recording or information reproduction with respect to the CD, and a second semiconductor laser 3 for emitting a laser beam $h_2$ with a predetermined wavelength $\lambda_2$ (650 nm) in the case of making information recording or information reproduction with respect to the DVD.

The hologram unit 2 includes a photoelectric conversion element 2b for receiving a laser beam $h_4$ which is a beam (hereinafter called "return beam") with the wavelength $\lambda_1$ reflected and returned by the CD and a beam split hologram 2c for splitting an optical path of the laser beam $h_4$ from an optical path of the laser beam $h_1$, along with the first semiconductor laser 2a.

Also, while a collimator lens 4 for forming the laser beam $h_1$ into a parallel beam, a quarter-wave plate 5 and a total reflection mirror 6 are placed in alignment of an optical axis with respect to an emission end of the first semiconductor laser 2a, a collimator lens 7 for forming the laser beam $h_2$ into a parallel beam, a diffraction grating 8 and a shaping prism 9 are placed in alignment of an optical axis with respect to an emission end of the second semiconductor laser 3.

Incidentally, the shaping prism 9 is a deflection angle prism in which a first prism 9a and a second prism 9b are bonded each other, and while a direction of the laser beam $h_2$ incident from a side of the diffraction grating 8 is changed to emit the beam to a side of an optical path joint prism 13 described below, a beam (hereinafter called "return beam") in which the laser beam with the wavelength $\lambda_2$ reflected with respect to the DVD returns from the side of the optical path joint prism 13 is reflected by a bonded surface 9c of the first and second prisms 9a, 9b to emit the beam in a predetermined direction.

Further, while a collimator lens 10 for gathering the return beam reflected by the bonded surface 9c of the shaping prism 9 and an aspherical lens 11 for aberration correction are provided, a photoelectric conversion element 12 for receiving the gathered return beam $h_3$ and converting the beam into an electrical signal to output the electrical signal is provided. The output signals of this photoelectric conversion element 12 and the photoelectric conversion element 2b are supplied to an RF amplifier (not shown) to perform control of various servos such as a focus servo or to process reproducing information recording on the CD or DVD.

An optical path joint prism 13 is placed in a position at which optical axis centers Q of both of the total reflection mirror 6 and the shaping prism 9 intersect, in other words, in a position at which optical paths of the laser beams $h_1$, $h_2$ intersect. Then, a reflective mirror 14 is placed in the opposite side of the total reflection mirror 6 through the optical path joint prism 13 in alignment of an optical axis and a photoelectric conversion element 15 acting as photodetection unit for monitor for detecting the intensity of the laser beams $h_1$, and $h_2$ is placed in the opposite side of the shaping prism 9 through the optical path joint prism 13 in alignment of an optical axis, respectively.

Then, as described below in detail, the optical path joint prism 13 is also used as monitor beam acquisition unit for acquiring a beam for monitor separately in case that the laser beams $h_1$, $h_2$ proceed to the reflective mirror 14.

Also, as shown in FIG. 2, an objective lens 16 opposite to a record surface of the CD or DVD mounted in a so-called clamp position is placed below the reflective mirror 14.

Also, a reflection surface of the reflective mirror 14 is inclined so that angles of incidence and reflection of the laser beams $h_1$, $h_2$ incident from the side of the optical path joint prism 13 toward the reflective mirror 14 and angles of incidence and reflection of the return beam which is reflected by the record surface of the CD or DVD and is incident toward the reflective mirror 14 through the objective lens 16 both become 45°.

Here, in the optical path joint prism 13, a medium with a shape of a parallel plate which is transparent with respect to the laser beams $h_1$, $h_2$ is used as a substrate, and a thin film coating of an anti-reflection coat film AR made of a dielectric material is applied to one surface (surface facing to the side of the total reflection mirror 6 and the photoelectric conversion element 15) of the substrate, and a thin film coating of a semi-transmission film HM with predetermined reflectance and transmittance made of a dielectric material is applied to the other surface (surface facing to the side of the shaping prism 9 and the reflective mirror 14) of the substrate.

Also, the optical path joint prism 13 is inclined and placed so that an angle of incidence of the laser beam $h_1$ which is reflected by the total reflection mirror 6 and is incident to the side of the anti-reflection coat film AR and an angle of incidence of the laser beam $h_2$ incident from the side of the shaping prism 9 to the semi-transmission film HM both become 45°.

In the embodiment, a reflectance of the anti-reflection coat film AR with respect to the beams with wavelengths $\lambda_1$, $\lambda_2$ is set to less than 1% (in other words, a transmittance of 99% or more).

In the semi-transmission film HM, transmittance and reflectance thereof are set with wavelength dependence, and for the wavelength $\lambda_1$ (780 nm), the beam is transmitted by about 90% and also is reflected by about 10% and for the wavelength $\lambda_2$ (650 nm), the beam is reflected by about 90% and also is transmitted by about 10%.

Next, an operation of the optical pickup apparatus with such a configuration will be described with reference to FIGS. 3 to 6. Incidentally, FIGS. 3 and 4 show an operation in the case of making information recording or information reproduction with respect to a CD, and FIGS. 5 and 6 show an operation in the case of making information recording or information reproduction with respect to a DVD.

Figure 3:
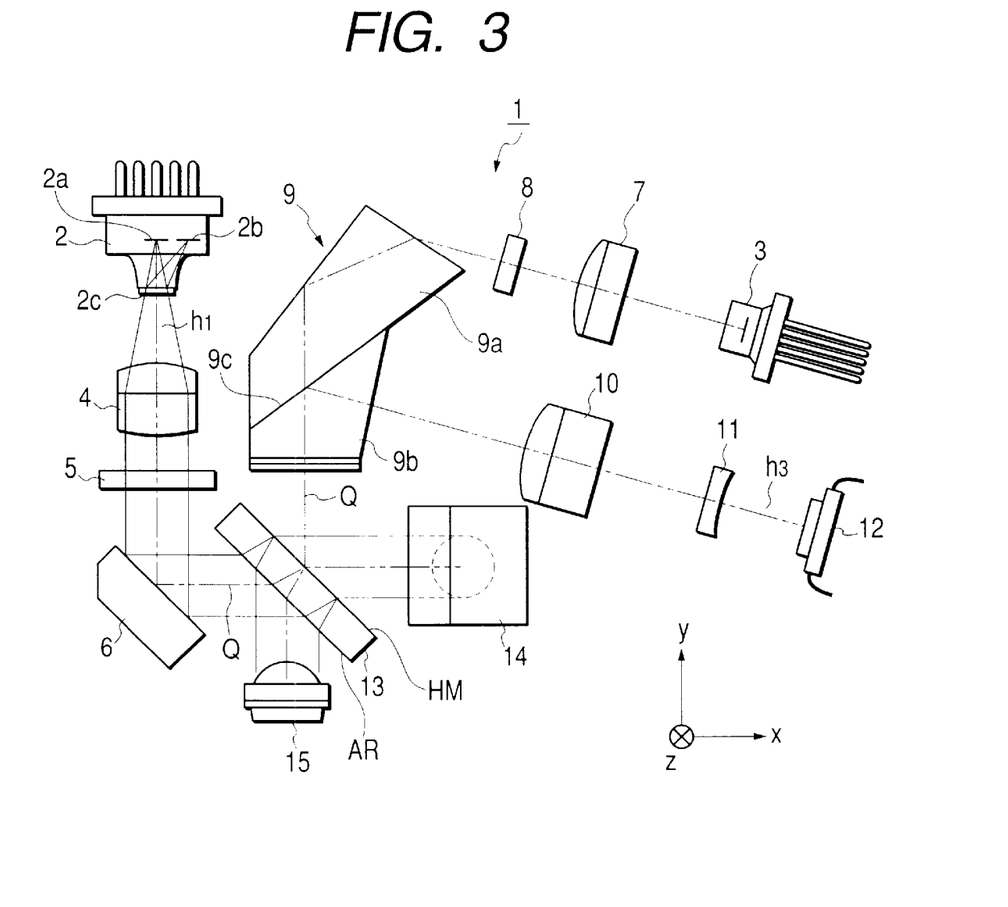
FIG. 3 shows an operation in case of making information recording or information reproduction with respect to a CD.

In the case of making information recording to the CD or making information reproduction from the CD, as shown in FIG. 3, a laser beam $h_1$ with a wavelength $\lambda_1$ is emitted from the first semiconductor laser $2a$ and the second semiconductor laser 3 is set in a turn-off state.

When a description is made in more detail, in the case of making the information recording to the CD, using a so-called power strategy method, the laser beam $h_1$ modulated on a basis of record data is emitted from the first semiconductor laser $2a$ and the second semiconductor laser 3 is set in a turn-off state.

In the case of making the information reproduction from the CD, the laser beam $h_1$ with constant intensity is emitted from the first semiconductor laser $2a$ and the second semiconductor laser 3 is set in a turn-off state.

Further, in any cases of the information recording and the information reproduction, by an APC circuit (automatic power control circuit) described below, driving electric power for emitting the first semiconductor laser $2a$ is controlled and feedback control is performed so that the intensity of the laser beam $h_1$ becomes a predetermined target value.

First, an operation in the case of making the information recording to the CD will be described. When a laser beam $h_1$, for information recording is emitted from the first semiconductor laser $2a$, the laser beam $h_1$ passes the collimator lens 4 and the quarter-wave plate 5, and is reflected by the total reflection mirror 6 and is incident to the side of the anti-reflection coat film AR of the optical path joint prism 13. The substantially entire laser beam $h_1$ passes through the anti-reflection coat film AR and reaches the semi-transmission film HM.

Figure 4A:
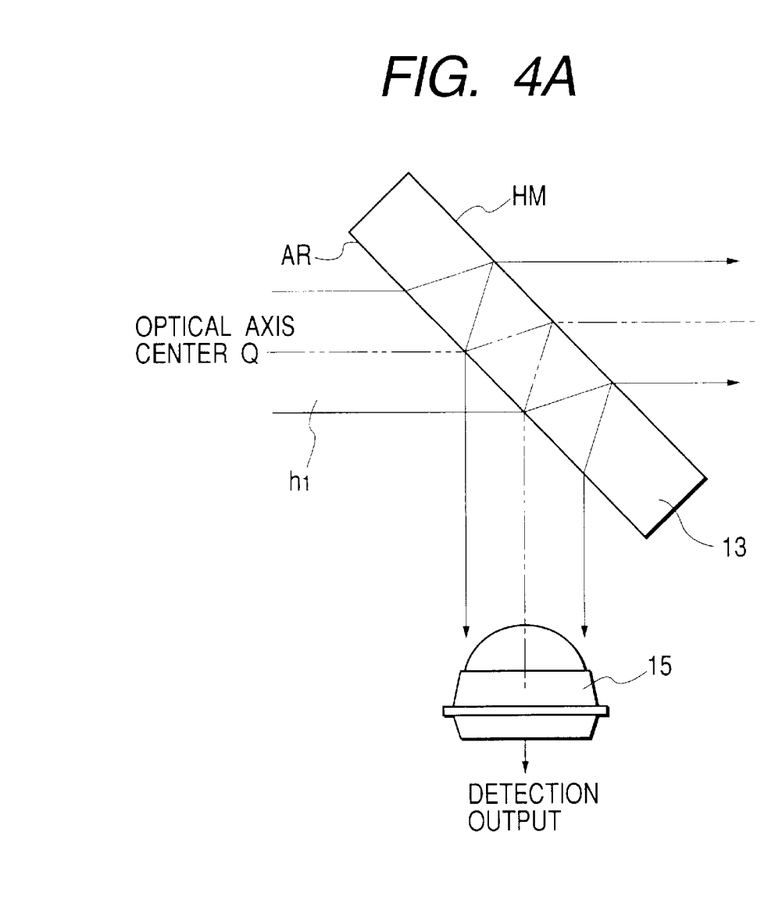
FIG. 4 shows a photodetection operation in the case of making information recording or information reproduction with respect to the CD.
Figure 5:
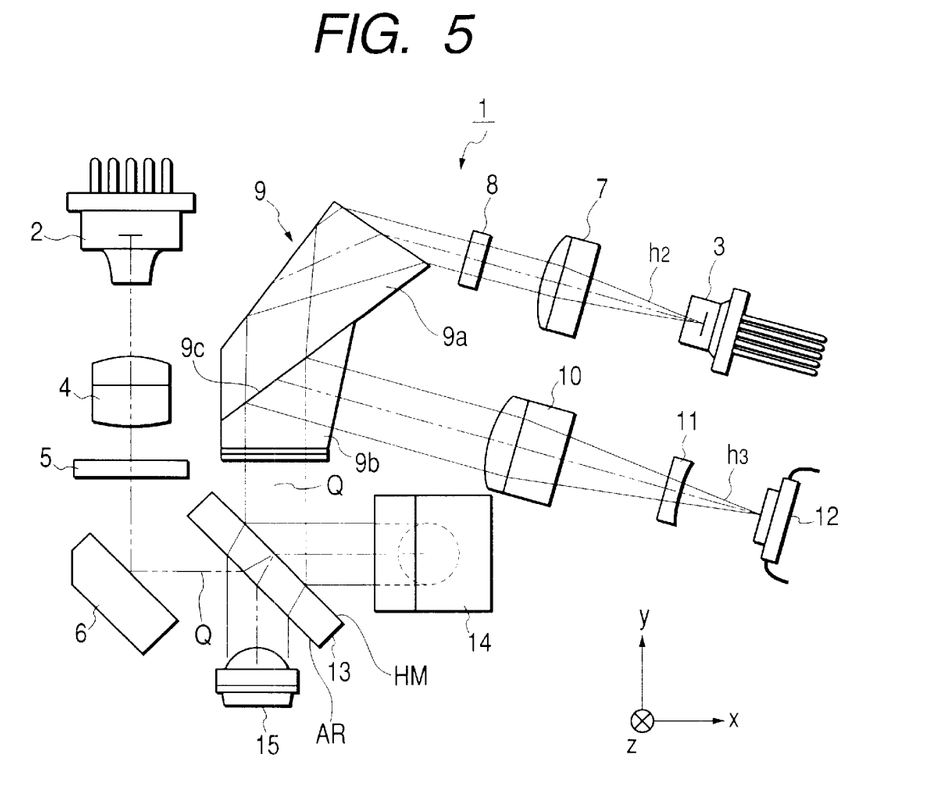
FIG. 5 shows an operation in case of making information recording or information reproduction with respect to a DVD.

Here, as shown in FIG. 4A, about 90% of the laser beam $h_1$, passes through the semi-transmission film HM and reaches the side of the reflective mirror 14 and is converged to a fine light beam by the objective lens 16 and is applied to a record surface of the CD, and the information recording or the information reproduction is made.

Further, about 10% of the laser beam $h_1$, is reflected by the semi-transmission film HM and again passes the inside of the substrate of the optical path joint prism 13 and is received by the photoelectric conversion element 15. Then, a detection output of the photoelectric conversion element 15 is supplied to the APC circuit (not shown) and the APC circuit performs feedback control of the driving electric power of the semiconductor laser $2a$ so that the intensity of the laser beam $h_1$ becomes a predetermined target value and thereby the light beam applied to the record surface of the CD is automatically adjusted to proper intensity.

Figure 4B:
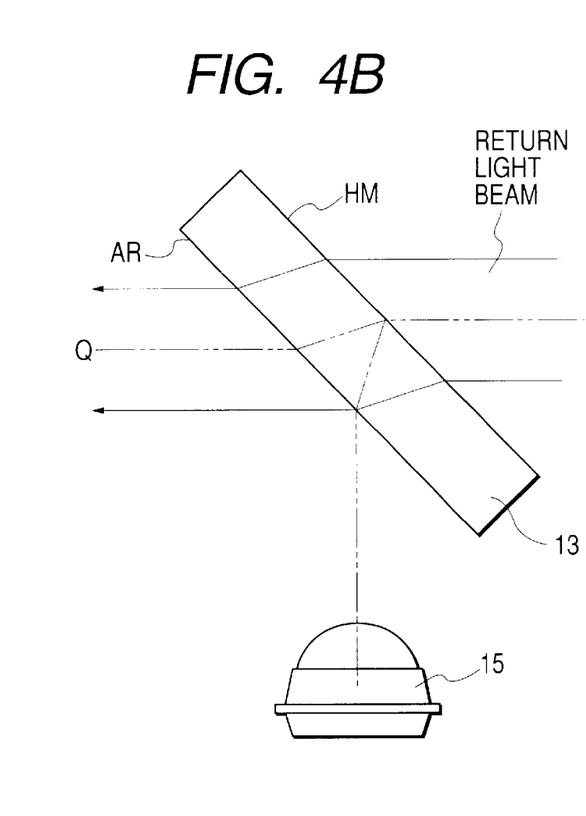

Also, a return beam caused by reflecting the light beam on the record surface of the CD passes the objective lens 16 and the reflective mirror 14 and, as shown in FIG. 4B, sequentially passes through the semi-transmission film HM and the anti-reflection coat film AR of the optical path joint prism 13 and proceeds to the total reflection mirror 6. Then, the return beam reflected by the total reflection mirror 6 passes the quarter-wave plate 5 and the collimator lens 4 and is formed into a laser beam $h_4$ toward the photoelectric conversion element $2b$ by the beam split hologram $2c$ of the hologram unit 2. The laser beam $h_4$ is received by the photoelectric conversion element $2b$. Then, servo control such as autofocus is performed on a basis of an output signal of the photoelectric conversion element $2b$.

Next, an operation in the case of making the information reproduction from the CD will be described. As shown in FIG. 3, when laser beam $h_1$ for information reproduction is emitted from the first semiconductor laser $2a$, the laser beam $h_1$ passes the collimator lens 4 and the quarter-wave plate 5 and is reflected by the total reflection mirror 6 and is incident to the side of the anti-reflection coat film AR of the optical path joint prism 13 and the substantially entire laser beam $h_1$ passes through the anti-reflection coat film AR and reaches the semi-transmission film HM.

Further, in a manner similar to that shown in FIG. 4A, about 90% of the laser beam $h_1$ passes through the semi-transmission film HM and is reflected by the reflective mirror 14 and further is converged to a fine light beam by the objective lens 16 and is applied to a record surface of the CD.

Also, in a manner similar to that shown in FIG. 4B, about 10% of the laser beam $h_1$, reaching the semi-transmission film HM is reflected by the semi-transmission film HM and again passes the inside of the substrate of the optical path joint prism 13 and is received by the photoelectric conversion element 15. Then, a detection output of the photoelectric conversion element 15 is supplied to the APC circuit and the APC circuit performs the feedback control of the driving electric power of the first semiconductor laser $2a$ so that the intensity of the laser beam $h_1$ becomes a predetermined target value and thereby the light beam applied to the record surface of the CD is automatically adjusted to proper intensity.

Further, a return beam including reproduction information caused by reflecting the light beam having proper intensity on the record surface of the CD passes the objective lens 16 and the reflective mirror 14 and passes through the optical path joint prism 13 toward the total reflection mirror 6 in a manner similar to that shown in FIG. 4B. Furthermore, the return beam reflected by the total reflection mirror 6 is received by the photoelectric conversion element $2b$ sequentially via the quarter-wave plate 5, the collimator lens 4 and the beam split hologram $2c$, and the information reproduction is made on a basis of an output signal of the photoelectric conversion element $2b$.

Next, an operation in the case of making information recording to the DVD or making information reproduction from the DVD will be described.

In the case of making information recording or information reproduction with respect to the DVD, as shown in FIG. 5, a laser beam $h_2$ with a wavelength $\lambda_2$ is emitted from the second semiconductor laser 3 and the first semiconductor laser $2a$ is set in a turn-off state.

Also, in a manner similar to the case of the CD, in the case of making the information recording to the DVD, using a so-called power strategy method, the laser beam $h_2$ modulated on a basis of record data is emitted from the second semiconductor laser 3 and the first semiconductor laser $2a$ is set in a turn-off state. Also, in a manner similar to the case of the CD, in the case of making the information reproduction from the DVD, the laser beam $h_2$ with constant intensity is emitted from the second semiconductor laser 3 and the first semiconductor laser $2a$ is set in a turn-off state.

Further, in any cases of the information recording and the information reproduction, driving electric power for emitting the second semiconductor laser 3 is controlled by the APC circuit and feedback control is performed so that the intensity of the laser beam $h_2$ becomes a predetermined target value.

First, an operation in the case of making the information recording to the DVD will be described. When laser beam $h_2$ for information recording is emitted from the second semiconductor laser 3, the laser beam $h_2$ passes the collimator lens 7, the diffraction grating 8 and the shaping prism 9 and is incident to the side of the semi-transmission film HM of the optical path joint prism 13.

Figure 6A:
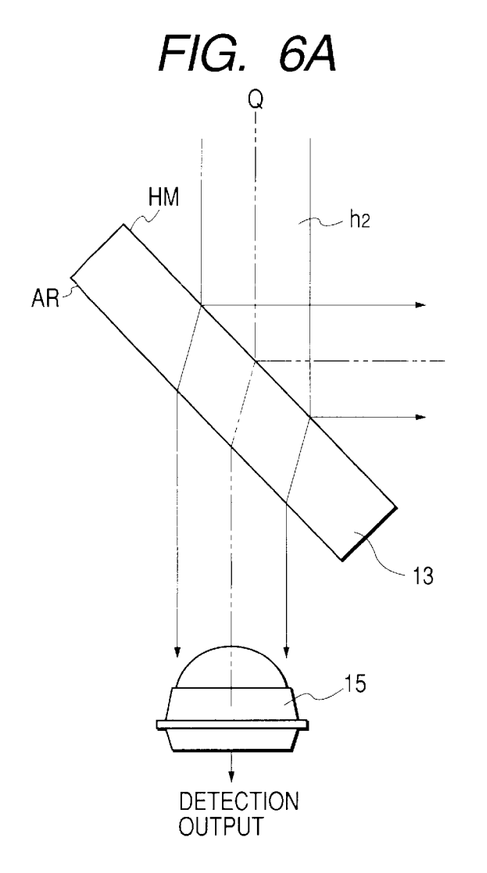
FIG. 6 shows a photodetection operation in the case of making information recording or information reproduction with respect to the DVD.

Here, as shown in FIG. 6A, about 90% of the laser beam $h_2$ is reflected by the semi-transmission film HM and reaches the side of the reflective mirror 14 and further is reflected by the reflective mirror 14 and is converged to a fine light beam by the objective lens 16 and is applied to a record surface of the DVD and the information recording is made.

Further, about 10% of the laser beam $h_2$ passes through the semi-transmission film HM and passes the inside of the substrate of the optical path joint prism 13 and is received by the photoelectric conversion element 15. Then, a detection output of the photoelectric conversion element 15 is supplied to the APC circuit and the APC circuit performs feedback control of the driving electric power of the second semiconductor laser 3 so that the intensity of the laser beam $h_2$ becomes a predetermined target value and thereby the light beam applied to the record surface of the DVD is automatically adjusted to proper intensity.

Figure 6B:
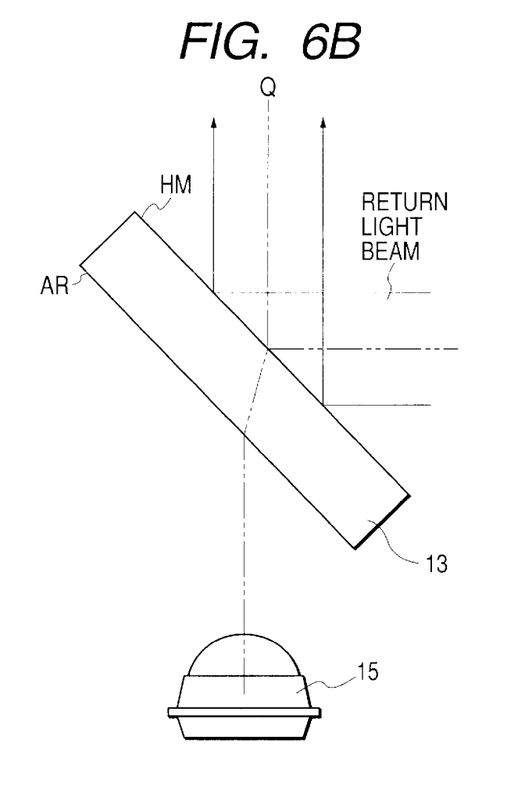

Also, a return beam caused by reflecting the light beam on the record surface of the DVD passes the objective lens 16 and the reflective mirror 14 and is incident to the side of the semi-transmission film HM of the optical path joint prism 13 and further is reflected by the semi-transmission film HM and is incident to the shaping prism 9 as shown in FIG. 6B. Then, the return beam incident to the shaping prism 9 is reflected by the bonded surface 9c and also is gathered by the collimator lens 10 and the aspherical lens 11 and is received by the photoelectric conversion element 12. Then, servo control such as auto-focus is performed on a basis of an output signal of this photoelectric conversion element 12.

Next, an operation in the case of making the information reproduction from the DVD will be described. When laser beam $h_2$ for information reproduction is emitted from the second semiconductor laser 3, the laser beam $h_2$ passes the collimator lens 7, the diffraction grating 8 and the shaping prism 9 and is incident to the side of the semi-transmission film HM of the optical path joint prism 13.

Here, in a manner similar to that shown in FIG. 6A, about 90% of the laser beam $h_2$ is reflected by the semi-transmission film HM to the side of the reflective mirror 14 and further is reflected by the reflective mirror 14 and is converged to a fine light beam by the objective lens 16 and is applied to a record surface of the DVD.

Further, about 10% of the laser beam $h_2$ passes through the semi-transmission film HM and passes the inside of the substrate of the optical path joint prism 13 and is received by the photoelectric conversion element 15. Then, a detection output of the photoelectric conversion element 15 is supplied to the APC circuit and the APC circuit performs feedback control of the driving electric power of the second semiconductor laser 3 so that the intensity of the laser beam $h_2$ becomes a predetermined target value and thereby the light beam applied to the record surface of the DVD is automatically adjusted to proper intensity.

Also, a return beam including reproduction information caused by reflecting the light beam on the record surface of the DVD passes the objective lens 16 and the reflective mirror 14. In a manner similar to that shown in FIG. 6B, the return beam is incident to the side of the semi-transmission film HM of the optical path joint prism 13 and further is reflected by the semi-transmission film HM and is incident to the shaping prism 9.

Then, the return beam incident to the shaping prism 9 is reflected by the bonded surface 9c and also is gathered by the collimator lens 10 and the aspherical lens 11 and is received by the photoelectric conversion element 12 and the information reproduction is made on a basis of an output signal of the photoelectric conversion element 12.

In the optical pickup apparatus 1 of the embodiment, the optical path joint prism 13 is disposed in a position where the optical paths of the laser beams $h_1$, $h_2$ with different wavelengths $\lambda_1$, $\lambda_2$ intersect, and thereby there is provided a configuration capable of detecting a part of the laser beams $h_1$ and $h_2$ by one photoelectric conversion element 15 through the optical path joint prism 13 in any cases of information recording or information reproduction by the laser beam $h_1$, and information recording or information reproduction by the laser beam $h_2$.

That is, as shown in FIG. 4A and FIG. 6A, when the laser beams $h_1$, $h_2$ are incident to the optical path joint prism 13, the optical path joint prism 13 reflects a part of the laser beam $h_1$ and also transmits a part of laser beam $h_2$ and both of their reflected beam and transmitted beam are emitted in a direction (direction of the photoelectric conversion element 15) of the same optical path. Therefore, each of intensity of the laser beams $h_1$, $h_2$ can be detected by only one photoelectric conversion element 15 placed in the direction of the same optical path and APC control of the semiconductor lasers 2a, 3 which are a light emission source can be performed based on the detection outputs.

As a result of this, according to the embodiment, the number of parts of the optical system for detecting the intensity of each of the laser beams $h_1$, $h_2$ for CD and DVD can be reduced remarkably, and a simple, small and light-weight optical pickup apparatus can be provided.

Further, in the embodiment, by providing the optical path joint prism 13, there is implemented a monitor mechanism of a front monitor method having a configuration for detecting the each of intensity of the laser beams $h_1$, $h_2$ emitted from the semiconductor lasers 2a, 3 in an optical path position before an application of the light beams $h_1$, $h_2$ to a CD and a DVD which are an information recording medium.

As another method for detecting the light emission intensity of the semiconductor laser, there is known a back monitor method in which semiconductor laser for emitting laser beams in two directions backward and forward is used and the laser beam emitted from one end of the semiconductor laser is used for information recording or information reproduction and the laser beam emitted from the other end of the semiconductor laser is monitored and thereby the intensity of the laser beam for information recording or information reproduction is detected.

However, this back monitor method is subject to an influence of a return beam particularly, so that the method was unsuitable for use as the information recording.

On the other hand, the optical pickup apparatus 1 of the embodiment uses the front monitor method, so that the influence of the return beam of the laser beams $h_1$, $h_2$ for information recording can be reduced to improve control accuracy by the APC control.

Further, the optical pickup apparatus 1 of the embodiment not only implements the front monitor method but also produces excellent effects capable of simplicity, miniaturization and weight reduction by using the configuration as described above.

Incidentally, the optical pickup apparatus 1 using the optical path joint prism 13 in which the anti-reflection coat film AR and the semi-transmission film HM are formed on the opposite surfaces of the transparent parallel plate (substrate) has been described, but the invention is not limited to this. An optical path joint prism in which an anti-reflection coat film and a semi-transmission film are formed on surfaces of a substrate, which are not parallel surfaces to each other, may be applied.

Figure 7:
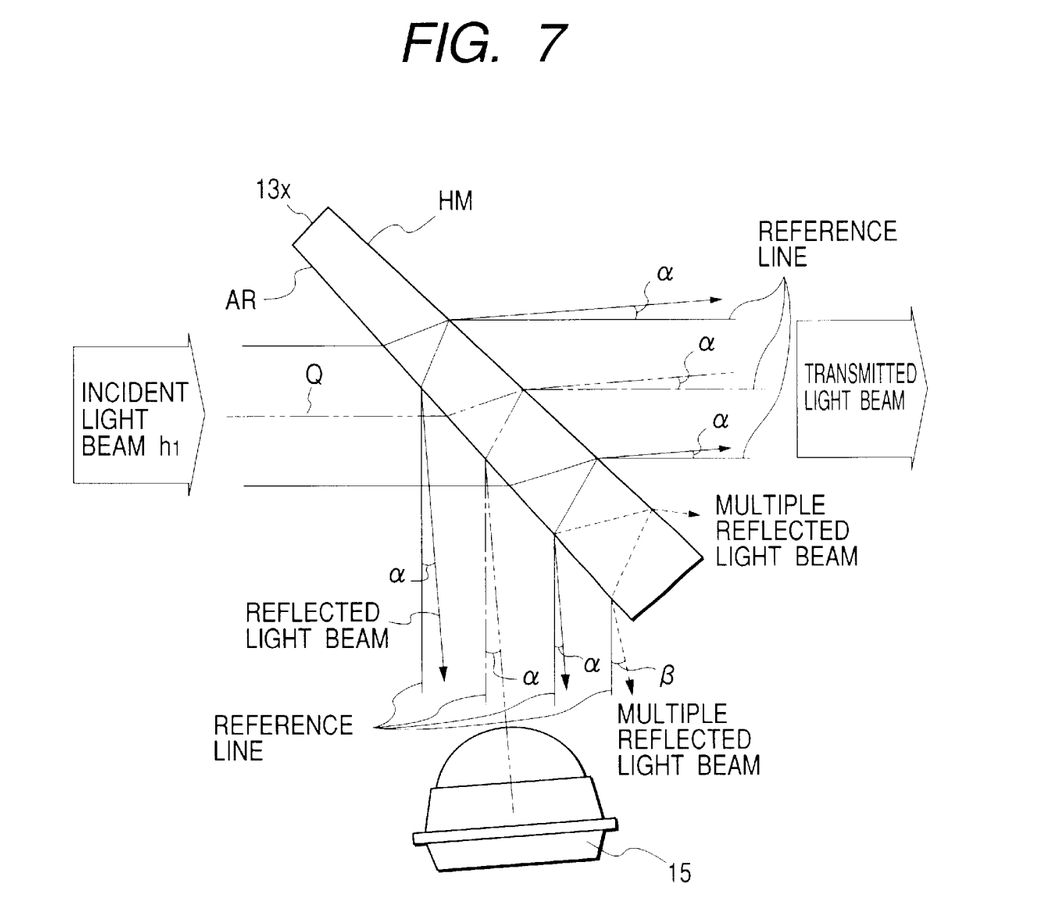
FIG. 7 shows a modified example of an optical path joint prism and a photodetection operation in the case of making information recording or information reproduction with respect to the CD.
Figure 8:
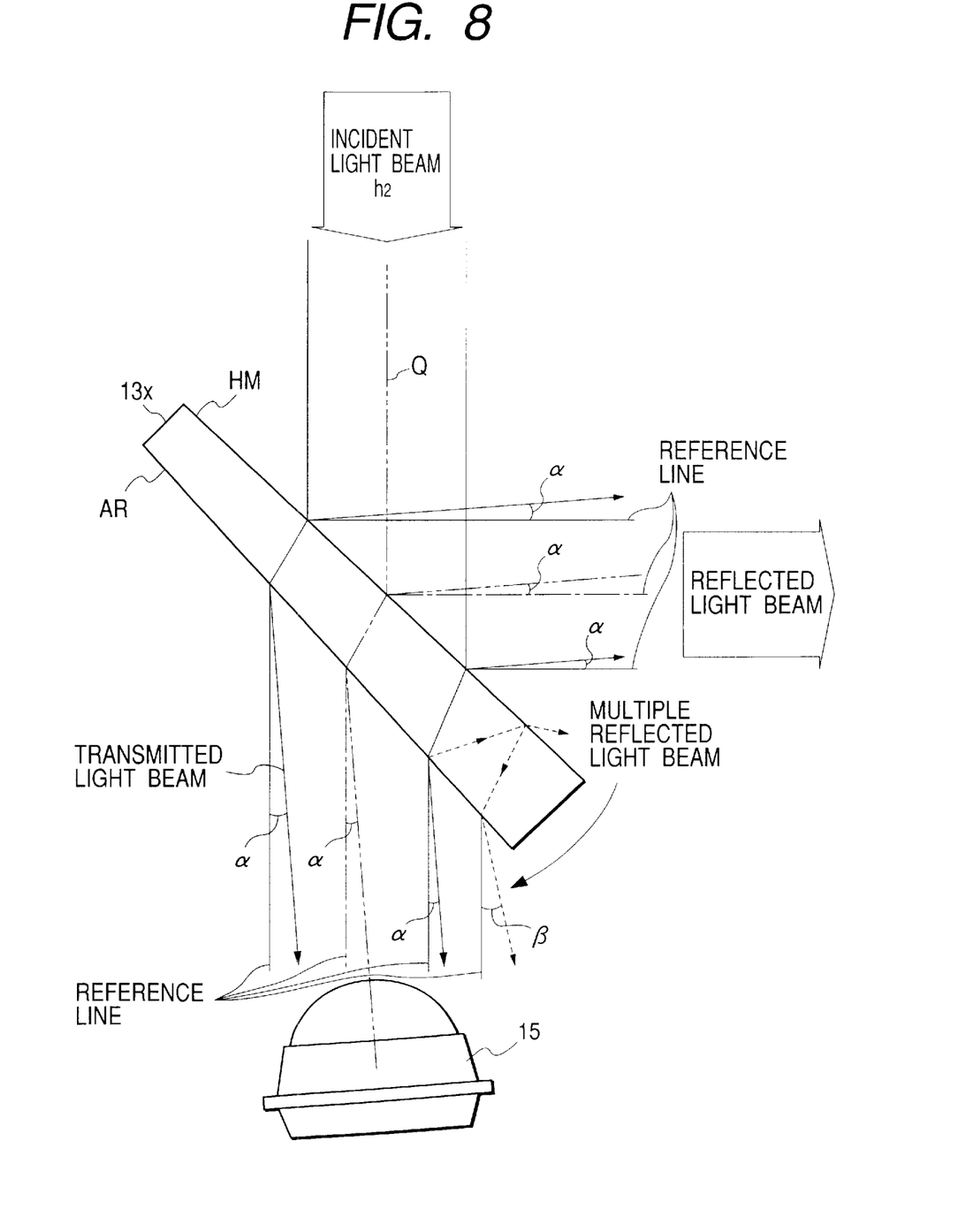
FIG. 8 shows a photodetection operation in the case of making information recording or information reproduction with respect to the DVD by the optical path joint prism shown in FIG. 7.

That is, as a modified example of the embodiment, as shown in FIGS. 7 and 8 corresponding to FIGS. 4 and 6, an optical path joint prism 13x in which an anti-reflection coat film AR and a semi-transmission film HM are formed on surfaces of a substrate, which are not parallel surfaces to each other rather than a substrate of the parallel plate may be applied.

A sectional shape of the substrate of this optical path joint prism 13x is a wedge shape in which the thickness is thicker with approaching the side of the photoelectric conversion element 15 and is thinner with being distant from the photoelectric conversion element 15.

When applying the optical path joint prism 13x with such a structure, the following effect can be obtained. In the case of making information recording or information reproduction with respect to a CD, as shown in FIG. 7, when an incident beam (laser beam) $h_1$ is incident from the side of the total reflection mirror 6 to the anti-reflection coat film AR, the substantially entire laser beam $h_1$, passes through the anti-reflection coat film AR and reaches the semi-transmission film HM and in the semi-transmission film HM, about 90% of the laser beam $h_1$ is formed into a transmitted beam and is emitted to the side of the reflective mirror 14 and about 10% of the laser beam $h_1$, is reflected and is incident to the photoelectric conversion element 15.

Here, generally, when the laser beam $h_1$, is reflected to the side of the substrate by the semi-transmission film HM, a multiple reflected beam also occurs in addition to a reflected beam, so that when these reflected beam and multiple reflected beam pass the inside of the substrate and are emitted to the side of the photoelectric conversion element 15, not only the reflected beam to be detected for APC control but also the multiple reflected beam are detected and it becomes difficult to improve accuracy of the APC control.

However, according to the optical path joint prism 13x having the section of the wedge shape, the problem can be improved remarkably. As shown in FIG. 7, lines, which are parallel or perpendicular to the incident light beam $h_1$, are taken as reference lines. The reflected beam reflected by the semi-transmission film HM of the optical path joint prism 13x is incident to the light receiving surface of the photoelectric conversion element 15 at an angle α to the reference lines and is detected for the APC control. As an incident plane of the prism (the surface of the anti-reflection coat film AR) is at 45° in relation to the incident light beam $h_1$, the lines perpendicular to the incident light beam $h_1$, are taken as the reference lines. When the incident plane of the prism (the surface of the anti-reflection coat film AR) is at other than 45° in relation to the incident light beam $h_1$, instead of the perpendicular lines, a direction where the incident light beam $h_1$ is reflected by the incident plane is taken as the reference lines.

As opposed to this reflected beam, the multiple reflected beam (shown by dotted lines with arrows in the drawing) attenuates gradually while repeating reflection and transmission between the anti-reflection coat film AR and the semi-transmission film HM. Further, since the sectional shape of the substrate is the wedge shape described above, the multiple reflected beam passing through the anti-reflection coat film AR and the semi-transmission film HM is emitted at a larger angle in correspondence with the number of reflections rather than parallel to the reference lines (that is, α<β). Therefore, the multiple reflected beam incident to the light receiving surface of the photoelectric conversion element 15 is remarkably reduced and further the multiple reflected beam included in the transmitted beam is remarkably reduced. Incidentally, the photoelectric conversion element 15 is disposed to be line symmetry in relation to the optical axis represented by chain double-dashed line.

In this manner, an influence of the multiple reflected beam can be reduced in the case of making information recording or information reproduction with respect to the CD, so that the APC control with great accuracy can be performed and the intensity of a light beam with respect to the CD can be automatically adjusted more properly.

Also, in the case of making information recording or information reproduction with respect to a DVD, as shown in FIG. 8, when an incident beam (laser beam) $h_2$ is incident from the side of the shaping prism 9 to the semi-transmission film HM, about 90% of the laser beam $h_2$ is formed into a reflected beam and is reflected to the side of the reflective mirror 14 and about 10% of the laser beam $h_2$ is transmitted and is incident to the photoelectric conversion element 15.

Also in this case, as described above, generally, when the laser beam $h_2$ passes through the semi-transmission film HM, a multiple reflected beam also occurs in addition to a transmitted beam, so that when these transmitted beam and multiple reflected beam pass the inside of the substrate and are emitted to the side of the photoelectric conversion element 15, not only the transmitted beam to be detected for APC control but also the multiple reflected beam are detected and it becomes difficult to improve accuracy of the APC control.

However, according to the optical path joint prism 13x having the section of the wedge shape, the transmitted beam passing through the semi-transmission film HM is incident to the light receiving surface of the photoelectric conversion element 15 at an angle α to reference lines and is detected for the APC control (As shown in FIG. 8, lines, which are parallel or perpendicular to the incident light beam $h_2$, are taken as the reference lines. When the incident plane of the prism (the surface of the semi-transmission coat film HM) is at other than 45° in relation to the incident light beam $h_2$ instead of the perpendicular lines, a direction where the incident light beam $h_2$ is reflected by the incident plane is taken as the reference lines). As opposed to this transmitted beam, the multiple reflected beam (shown by dotted lines with arrows in FIG. 8) attenuates gradually while repeating reflection and transmission between the anti-reflection coat film AR and the semi-transmission film HM. Further, since the sectional shape of the substrate is the wedge shape described above, the multiple reflected beam passing through the anti-reflection coat film AR and the semi-transmission film HM is emitted at a larger angle in correspondence with the number of reflections rather than parallel to the reference lines (that is, α<β). Therefore, the multiple reflected beam incident to the light receiving surface of the photoelectric conversion element 15 is remarkably reduced. Incidentally, the photoelectric conversion element 15 is disposed to be line symmetry in relation to the optical axis represented by chain double-dashed line.

In this manner, an influence of the multiple reflected beam can be reduced in the case of making information recording or information reproduction with respect to the DVD, so that the APC control with great accuracy can be performed and the intensity of a light beam with respect to the DVD can be automatically adjusted more properly.

Incidentally, in FIGS. 7 and 8, the optical path joint prism 13x may be inclined and placed so that an angle of incidence of the laser beam $h_2$ with respect to the semi-transmission film HM becomes 45° and an angle of incidence of the laser beam $h_1$ with respect to the anti-reflection coat film AR becomes 45° or more, and also in this case, an influence of the multiple reflected beam can be reduced. Also, in reverse to that, the optical path joint prism 13x may be inclined and placed so that the angle of incidence of the laser beam $h_2$ with respect to the semi-transmission film HM becomes 45° or more and the angle of incidence of the laser beam $h_1$ with respect to the anti-reflection coat film AR becomes 45°.

Further, the optical path joint prism 13x may be inclined and placed so that an angle of incidence of the laser beam $h_2$ with respect to the semi-transmission film HM and an angle of incidence of the laser beam $h_1$ with respect to the anti-reflection coat film AR both become 45° or more.

Figure 9:
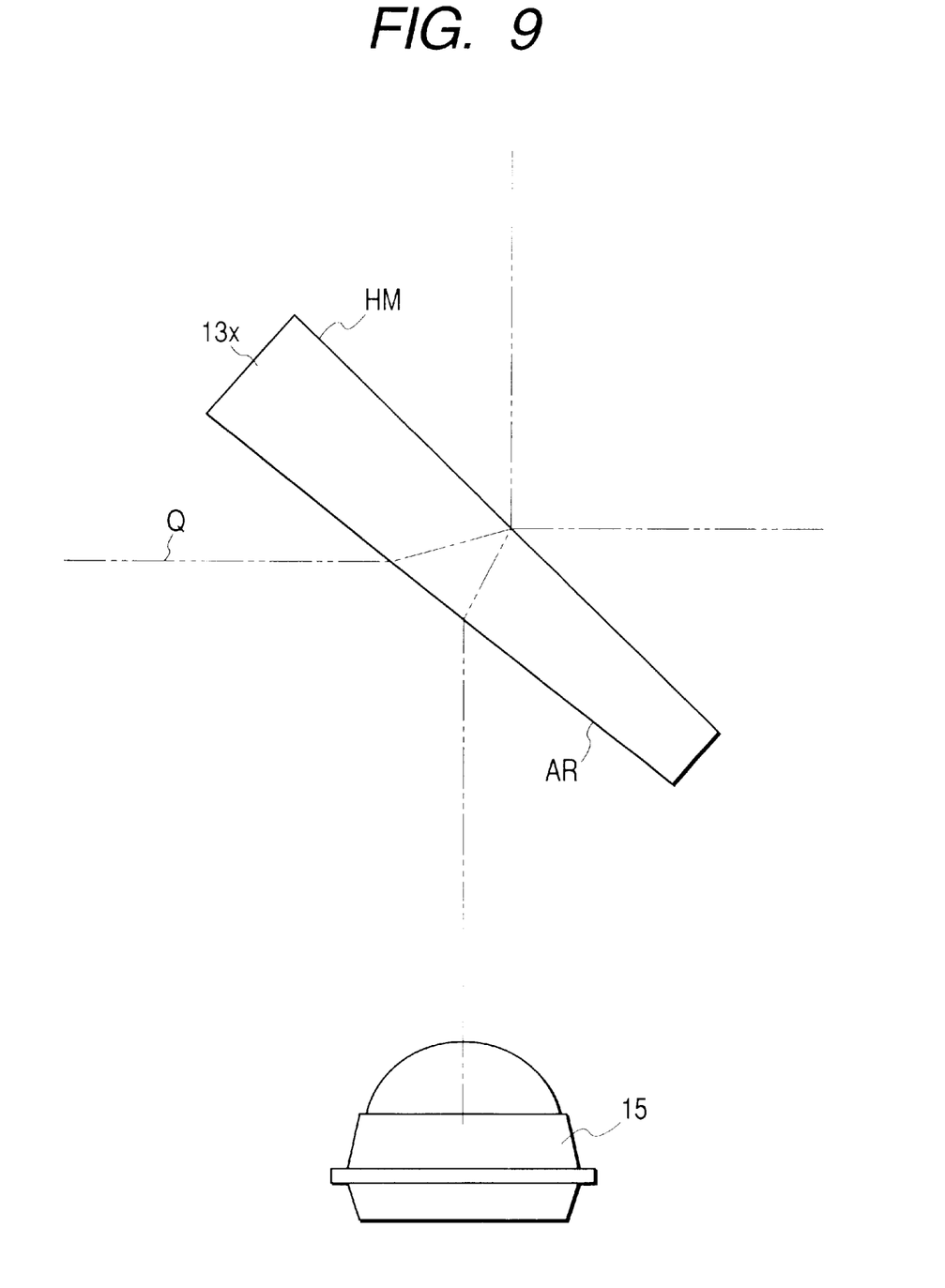
FIG. 9 shows a further modified example of an optical path joint prism.

Furthermore, as another modified example, as shown in FIG. 9, the thickness of the substrate of the optical path joint prism 13x may be reversed compared with the case of FIG. 8. That is, a sectional shape of the substrate of the optical path joint prism 13x may be formed into a wedge shape in which the thickness is thinner with approaching the side of the photoelectric conversion element 15 and is thicker with being distant from the photoelectric conversion element 15.

Further, it may be done that an angle of incidence of the laser beam $h_2$ with respect to the semi-transmission film HM of the optical path joint prism 13x shown in FIG. 9 and an angle of incidence of the laser beam $h_1$, of the optical path joint prism 13x shown in FIG. 9 with respect to the anti-reflection coat film AR become 45°, and it may be properly adjusted to become an angle more than 45°, and in any cases, an influence of the multiple reflected beam can be reduced.

Furthermore, in the optical pickup apparatus shown in FIGS. 1 to 9, it is constructed that the laser beam $h_1$, for making information recording or information reproduction with respect to the CD is emitted from the side of the anti-reflection coat film AR of the optical path joint prism 13 and the laser beam $h_2$ for making information recording or information reproduction with respect to the DVD is emitted from the side of the semi-transmission film HM of the optical path joint prism 13, but in reverse to this, it may be constructed that the laser beam $h_2$ for making information recording or information reproduction with respect to the DVD is emitted from the side of the anti-reflection coat film AR of the optical path joint prism 13 and the laser beam $h_1$, for making information recording or information reproduction with respect to the CD is emitted from the side of the semi-transmission film HM of the optical path joint prism 13.

Furthermore, reflectance and transmittance of the semi-transmission film HM described above can be properly changed according to design specifications. That is, the reflectance and transmittance of the semi-transmission film HM can be properly changed so that the intensity of a beam incident to the side of the reflective mirror 14 becomes larger than the intensity of a beam incident to the photoelectric conversion element 15 through the optical path joint prism 13. Then, when the reflectance and transmittance of the semi-transmission film HM are set so that the intensity of the beam incident to the side of the reflective mirror 14 becomes larger than the intensity of the beam incident to the photoelectric conversion element 15, positions of the photoelectric conversion element 15 and the reflective mirror 14 are counterchanged each other and an objective lens can be placed corresponding to the replaced reflective mirror 14.

Furthermore, the anti-reflection coat film AR may be omitted according to design specifications.

Also, the optical pickup apparatus for CD or DVD has been described, but the optical pickup apparatus of the invention is not limited to the CD and DVD, and information recording or information reproduction can be made by using beams with different wavelengths (not limited to two wavelengths) with respect to other information recording media.

As described above, according to an optical pickup apparatus of the invention, optical path joint unit adapted to guide light beams with different wavelengths emitted from light emission sources to the side of an integrated optical path, respectively, is provided and each of light beams is detected by photodetection unit provided in the integrated optical path, so that each of the light beams can be detected by one photodetection unit. As a result of this, an optical pickup apparatus having compatibility capable of miniaturization and weight reduction can be provided.

Also, the optical path joint unit comprises a transparent medium having a first surface and a second surface, which are not parallel to each other, and a semi-transmission film provided on the second surface and is formed by an optical element in which one beam is launched from the side of the first surface and also the other beam is launched from the side of the second surface, so that it can be constructed so that a multiple reflected beam occurring in the case that one beam incident from the side of the second surface passes through the semi-transmission film does not reach the photodetection means. As a result of this, an influence of the multiple reflected beam can be reduced to perform photodetection necessary to control the light emission intensity of the light emission sources, and the light emission intensity of the light emission sources can be controlled with high accuracy.

What is claimed is:

1. An optical pickup apparatus comprising:
    a plurality of light emission sources adapted to emit light beams having different wavelengths, respectively;
    an optical path joint unit having a transparent medium having a first surface and a second surface, which are opposed to each other, and a semi-transmission film provided on the second surface, the optical path joint unit adapted to join optical paths of the light beams to form common optical path, in which one of the light beams is incident on the first surface, and the other of the light beams is incident on the second surface; and
    a photodetection unit provided in the common optical path and adapted to detect the light beams,
    wherein each of light emission intensities of the light emission sources is controlled on a basis of a detection result detected by the photodetection unit.

2. The optical pickup apparatus according to claim 1, wherein the number of the plurality of the light emission sources is two.

3. The optical pickup apparatus according to claim 2, wherein the optical path joint unit splits the one of the light beams into a first transmitted light beam emitted to an information recording medium and a first reflected light beam emitted to the photodetection unit through the transparent medium by the semi-transmission film;

the optical path joint unit splits the other of the light beams into a second reflected light beam emitted to an information recording medium and a second transmitted light beam emitted to the photodetection unit through the transparent medium by the semi-transparent film.

4. The optical pickup apparatus according to claim 2, wherein the first surface and the second surface are parallel.

5. The optical pickup apparatus according to claim 2, wherein the first surface and the second surface are not parallel.

6. The optical pickup apparatus according to claim 5, wherein the first surface and the second surface are set at angles in relation to the laser beams, respectively, so that multiple reflected light beam, which is a light beam reflected between the first and second surfaces repeatedly, does not reach the photodetection unit.

* * * * *